United States Patent
Kato et al.

(10) Patent No.: US 9,271,512 B2
(45) Date of Patent: Mar. 1, 2016

(54) CRYSTAL GROWTH INHIBITOR FOR FATS AND OILS

(75) Inventors: Hiroyuki Kato, Yokkaichi (JP); Yuuji Sakamoto, Yokkaichi (JP); Yoshihiko Takase, Yokkaichi (JP)

(73) Assignee: TAIYO KAGAKU CO., LTD., Yokkaichi-Shi (JP)

( * ) Notice: Subject to any disclaimer, the term of this patent is extended or adjusted under 35 U.S.C. 154(b) by 590 days.

(21) Appl. No.: 13/055,150

(22) PCT Filed: Jul. 24, 2009

(86) PCT No.: PCT/JP2009/063287
§ 371 (c)(1),
(2), (4) Date: Jan. 21, 2011

(87) PCT Pub. No.: WO2010/010953
PCT Pub. Date: Jan. 28, 2010

(65) Prior Publication Data
US 2011/0123695 A1        May 26, 2011

(30) Foreign Application Priority Data
Jul. 24, 2008    (JP) ................................. 2008-191437

(51) Int. Cl.
A23D 9/013        (2006.01)
(52) U.S. Cl.
CPC ..................................... A23D 9/013 (2013.01)
(58) Field of Classification Search
None
See application file for complete search history.

(56) References Cited

U.S. PATENT DOCUMENTS

| 5,733,594 | A   | 3/1998  | Hirose et al. |
| 5,773,073 | A * | 6/1998  | Matsuda et al. ............. 800/300 |
| 5,897,906 | A * | 4/1999  | Suwa et al. ................... 426/611 |
| 7,629,479 | B2  | 12/2009 | Kondo et al. |

FOREIGN PATENT DOCUMENTS

| JP | 63-79560 A    | 9/1988 |
| JP | 9-176680 A    | 8/1997 |
| JP | 10-245583 A   | 9/1998 |
| JP | 2002-212587 A | 7/2002 |
| JP | 2004-189965 A | 7/2004 |
| JP | 2006-346526 A | 12/2006 |
| WO | WO 2006/041011 A1 | 4/2006 |

OTHER PUBLICATIONS

Machine Translation of JP 10-245583. Published Sep. 14, 1998, Itsuki, Matsumura, et. al. pp. 1-7.*
Machine Translation of JP 2002-212587. Published Jul. 31, 2002, Shigehira, Kuriyama, et al. pp. 1-6.*
Machine Translation of JP 2004-189965. Published Jul. 8, 2004, Takeshi, Kawai, et al. pp. 1-16.*
Hendrickson, "The Determination of Primary Alcohol Groups in Polyglycols Using Triphenylchloromethane", Analytical Chemistry, vol. 36, No. 1, Jan. 1964, pp. 126-128.

* cited by examiner

Primary Examiner — Jenna A Watts
(74) Attorney, Agent, or Firm — Birch, Stewart, Kolasch & Birch, LLP

(57) ABSTRACT

An inhibitor for crystal growth of fats and oils, containing a polyglycerol fatty acid ester, which is an esterified product formed between a polyglycerol and a fatty acid, the polyglycerol having a hydroxyl value of 850 mg KOH/g or less and a ratio of primary hydroxyl groups to all the hydroxyl groups of the polyglycerol of 50% or more, wherein the polyglycerol fatty acid ester has a hydroxyl value of 100 mg KOH/g or less. Since the inhibitor for crystal growth of fats and oils of the present invention can inhibit crystal growth of fats and oils by adding the inhibitor to fats and oils, storage property of the fats and oils in a refrigerator, cold climates, or the like, so that the inhibitor can be suitably used in liquid fats and oils such as salad oil for which transparency is important.

4 Claims, No Drawings

CRYSTAL GROWTH INHIBITOR FOR FATS AND OILS

TECHNICAL FIELD

The present invention relates to an inhibitor for crystal growth of fats and oils. More particularly, the present invention relates to an inhibitor for crystal growth of liquid fats and oils at low temperatures, and a composition of fats and oils containing the inhibitor.

BACKGROUND ART

In general, fats and oils such as rapeseed oil, rice oil, soybean oil, and cottonseed oil are in the form of liquid at normal temperature. These liquid fats and oils are stored at low temperatures in a refrigerator, cold climates, or the like, whereby a wax component or a high-melting point triglyceride is crystallized. Consequently, there are some disadvantages that fluidity of the oils is lost and that white turbid or separation is caused, thereby lowering their commercial values.

In addition, at present, palm oil has been remarked in fats and oil industries, and the amount of production thereof is in the second place next to soybean oil in the world ranking for vegetable fats and oils, so that palm oil has become a raw material indispensable in the fats and oils industries. As liquid fats and oils, a composition of fats and oils containing palm oil has been proposed. However, the fats and oils derived from palm oil contain POP(2-oleo-1,3-dipalmitin), which is a triglyceride component having a high melting point, so that there are some disadvantages that crystal growth takes place at low temperatures, thereby generating cloudiness.

In order to overcome these disadvantages, liquid fats and oils is produced by adding a solvent or the like to raw material fats and oils, or produced by fractionation by carrying out a so-called wintering process of directly cooling raw material fats and oils to precipitate out a solid fat which is causation of crystallization, and thereafter separating the precipitates by a means such as dropping, centrifugation, or filtration. For example, liquid fats and oils used in mayonnaise or salad dressings that are stored at low temperatures is produced by a method such as controlling the conditions for a wintering process, thereby removing an even larger amount of solid fats and oils, or subjecting raw material fats and oils previously subjected to transesterification to lower crystallinity to a wintering process, or the like.

However, a method of removing a solid fat by a wintering process is likely to lead to the lowering of productivity or the lowering of a production yield of liquid fats and oils depending upon the processing capacity, thereby making it likely to increase in its production cost.

The palm oil can be fractionated into a high-melting point component palm stearin and a low-melting point component palm olein by a wintering process, and the palm olein can be further separated into a high-melting point component PMF (palm mid fraction) and a low-melting component super olein. However, although the high-melting point triglyceride component is notably reduced in the super olein, the cloud point is still several degrees° C., so that crystals are precipitated in storage in a refrigerator, or cold climates, or in the wintry season, thereby making it difficult to merchandize for liquid fats and oils such as fats and oils for households for which transparency is important.

In view of the above, techniques of inhibiting crystal growth of fats and oils using a specified polyglycerol fatty acid ester have been reported (see Patent Publications 1 to 5).

In addition, Patent Publication 6 discloses a polyglycerol fatty acid ester having excellent solubilizability and emulsifiability.

PRIOR ART PUBLICATIONS

Patent Publications

Patent Publication 1: Japanese Patent Laid-Open No. Sho-63-79560
Patent Publication 2: Japanese Patent Laid-Open No. Hei-9-176680
Patent Publication 3: Japanese Patent Laid-Open No. Hei-10-245583
Patent Publication 4: Japanese Patent Laid-Open No. 2002-212587
Patent Publication 5: Japanese Patent Laid-Open No. 2004-189965
Patent Publication 6: Japanese Patent Laid-Open No. 2006-346526

SUMMARY OF INVENTION

Problems to be Solved by the Invention

When a polyglycerol fatty acid ester as disclosed in Patent Publications 1 to 6 is blended with fats and oils for which transparency is not required, such as margarine, and the fats and oils are stored at low-temperatures, no changes in external appearances due to crystal precipitation of the fats and oils are found. However, when blended with liquid fats and oils for which transparency is important, such as liquid fats and oils for households, an effect of inhibiting crystal growth is not sufficient, so that a further inhibitor for crystal growth is in demand.

An object of the present invention is to provide an inhibitor for crystal growth of fats and oils, which has an excellent effect of inhibiting crystal growth of fats and oils at low temperatures, and sustaining its effect, and a composition of fats and oils containing the inhibitor.

Means to Solve the Problems

As a result of intensive studies in order to solve the above problems, the present inventors have found that in a case of a polyglycerol fatty acid ester obtained from a polyglycerol having a hydroxyl value of 850 mg KOH/g or less, and a ratio of the primary hydroxyl groups to the constituting hydroxyl groups of 50% or more, the polyglycerol fatty acid ester further having a specified hydroxyl value, the polyglycerol fatty acid ester is added to edible fats and oils, whereby some effects of inhibiting crystal growth in fats and oils at low temperatures and making it less likely to generate cloudiness are found. The present invention has been perfected thereby.

Specifically, the present invention relates to:

[1] an inhibitor for crystal growth of fats and oils, containing a polyglycerol fatty acid ester, which is an esterified product formed between a polyglycerol and a fatty acid, the polyglycerol having a hydroxyl value of 850 mg KOH/g or less, and a ratio of primary hydroxyl groups to all the hydroxyl groups of the polyglycerol of 50% or more, wherein the polyglycerol fatty acid ester has a hydroxyl value of 100 mg KOH/g or less; and

[2] a composition of fats and oils containing fats and oils, and the inhibitor for crystal growth of fats and oils as defined in the above [1], wherein the composition contains a polyglycerol fatty acid ester in an amount of from 0.005 to 5% by weight.

Effects of the Invention

The inhibitor for crystal growth of fats and oils of the present invention exhibits excellent effects such that crystal growth of fats and oils at low temperatures can be inhibited. Also, even when the inhibitor is blended with liquid fats and oils that requires transparency, the generation of cloudiness is inhibited, and its effect is sustained, so that storage ability of the fats and oils is improved, which in turn can contribute to improvement in commercial values, and improvement in handling.

MODES FOR CARRYING OUT THE INVENTION

The polyglycerol fatty acid ester, which is a substantial active ingredient of the inhibitor for crystal growth of fats and oils of the present invention, is obtained by esterification of a specified polyglycerol and a fatty acid, the polyglycerol having a hydroxyl value of 850 mg KOH/g or less, and a ratio of primary hydroxyl groups to all the hydroxyl groups of the polyglycerol of 50% or more.

The polyglycerol is a polymer of glycerol, and refers to a substance having a hydroxyl group and an ether bond within the molecule, obtained by dehydration condensation of glycerol, or the like. Usually, the polyglycerol is obtained by heating glycerols under a normal pressure or reduced pressure in the presence of an alkali catalyst. In addition, the polyglycerol can be purified by removing a low-boiling point component by passing a gas such as nitrogen or steam, removing an ionic component such as a catalyst used in an ion exchanging resin, an ion exchange membrane or the like, removing a color component or an odor component using an adsorbent such as an activated charcoal, subjecting to a reducing treatment such as hydrogenation, fractionating by molecular distillation or rectification, or the like, depending upon the purpose of use.

Here, in a case where a polyglycerol is produced using glycerol as a raw material, intramolecular condensation takes place during the dehydration condensation, so that undesirable by-products, such as a 6-membered ring or a 8-membered ring, are generated. In the present invention, the polyglycerol containing little by-products can be prepared by using glycidol, epichlorohydrin, monochlorohydrin, or the like as a raw material, so as not to generate these by-products.

The polyglycerol has a hydroxyl value of 850 mg KOH/g or less, preferably 840 mg KOH/g or less, and more preferably 800 mg KOH/g or less, from the viewpoint of an effect of inhibiting crystal growth of fats and oils. The polyglycerol has a hydroxyl value of preferably 750 mg KOH/g or more, from the viewpoint of operability and esterification reaction with a fatty acid. In addition, in a case where two or more kinds of polyglycerols are used, it is preferable that a hydroxyl value obtained by calculating its weighted average is within the range mentioned above, and it is more preferable that each polyglycerol has a hydroxyl value within the range mentioned above. Here, the term "hydroxyl value" as used herein refers to a value measured by a standard test analysis method of fats and oils (pyridine-acetic anhydride method, 2.3.6.2-1996).

A method of adjusting a hydroxyl value of the polyglycerol is not particularly limited. For example, in a case where a polyglycerol is prepared in accordance with a glycerol polymerization method, a glycidol polymerization method, or the like, the hydroxyl value is lowered with the passage of the polymerization reaction time, so that the hydroxyl value can be adjusted by confirming the process of lowering a hydroxyl value of a polyglycerol during the reaction.

In addition, the polyglycerol has a ratio of primary hydroxyl groups to all the hydroxyl groups (hereinafter referred to as a primary hydroxyl group content ratio) of 50% or more, preferably 55% or more, more preferably 60% or more, and even more preferably 70% or more, from the viewpoint of an effect of inhibiting crystal growth of fats and oils. The upper limit is not particularly limited, and in order to exhibit the effects to the maximum, it is preferable that the ratio is 100% or less. In addition, in a case where two or more kinds of polyglycerols are used, it is preferable that a primary hydroxyl group content ratio obtained by calculating its weighted average is within the range mentioned above, and it is more preferable that each polyglycerol used has a primary hydroxyl group content ratio within the range mentioned above. Here, the term "primary hydroxyl group content ratio" as used herein is calculated by a method of determination of nuclear magnetic resonance spectrum (NMR) of carbon atoms and hydrogen atoms.

The polyglycerol has a ratio of secondary hydroxyl groups to all the hydroxyl groups (hereinafter referred to as a secondary hydroxyl group content ratio) of 50% or less, preferably 45% or less, more preferably 40% or less, even more preferably 30% or less, and even more preferably 0%, from the viewpoint of an effect of inhibiting crystal growth of fats and oils. Here, the secondary hydroxyl group content ratio refers to a value calculated by the following formula:

$$\text{Secondary Hydroxyl Group Content Ratio (\%)} = 100 \text{ (\%)} - \text{Primary Hydroxyl Group Content Ratio (\%)}.$$

A method of adjusting a primary hydroxyl group content ratio is not particularly limited. For example, the polyglycerol obtained as mentioned above is treated with a reagent selectively reactive with a primary hydroxyl group, in other words, a reagent that serves as a protective group of the primary hydroxyl group, to change a polarity of the polyglycerol. Subsequently, utilizing the fact that a polyglycerol having a larger content of primary hydroxyl groups would have a lower polarity, the primary hydroxyl group content ratio can be adjusted by properly selecting a polyglycerol having a primary hydroxyl group. Here, the selected polyglycerol may be subjected to a removal treatment of the protective group in accordance with a method known to one of ordinary skill in the art.

The reagent selectively reactive with a primary hydroxyl group include, for example, t-butyldiphenylsilyl chloride, isobutene, 1-trimethylpyridinium tetrafluoroborate, t-butyldimethylsilyl chloride, chlorotriphenylmethyl, and the like.

The reaction ratio of the polyglycerol and the above-mentioned reagent is properly adjusted in accordance with the number of primary hydroxyl groups in the desired polyglycerol. In order to surely progress with the reaction, it is preferable that the above-mentioned reagent is used in excess. For example, the above-mentioned reagent is used in an amount of preferably from 2 to 10 mol, and more preferably from 3 to 7 mol, per one mol of the polyglycerol.

The reaction between the polyglycerol and the above-mentioned reagent is carried out at a temperature of preferably from −78° to 150° C., more preferably from 0° to 100° C., from the viewpoint of sureness in the progress of the reaction and in the protection.

A method of fractionating the intended polyglycerol from the resulting reaction mixture can be accomplished by utilizing chemical and physical differences between the polyglycerols into which protective groups are introduced. For example, the intended polyglycerol can be fractionated by a method such as distillation, vacuum distillation, or molecular distillation, utilizing a difference in boiling points, or the intended polyglycerol can be subjected to fractionation utilizing a difference in solubilities to water or an organic solvent. For example, the intended polyglycerol can be subjected to fractionation by dispersing a reaction mixture in water, and extracting the dispersion with an organic solvent immiscible with water (for example, chloroform, dichloromethane, petroleum ether, hexane, benzene, toluene, an ether, ethyl acetate, or the like). When this method of fractionation is used, a water-containing ethanol, or a solution of an inorganic salt such as an aqueous sodium chloride or an aqueous sodium sulfate can also be used in place of water. It is preferable that the intended polyglycerol is subjected to fractionation using water and ethyl acetate.

The removal of the protective group of the fractionated polyglycerol can be carried out by a method performed in general organic synthesis. For example, the elimination of the protective group is accomplished by a method of treating p-toluenesulfonic acid in methanol, a method of heating in an aqueous acetic acid solution while stirring, or the like. As one example, when a triphenylmethyl group is introduced into a polyglycerol, the protective group can be removed by adding an aqueous acetic acid solution in a volume of about twice to about thrice that of the resulting reaction mixture, and stirring the mixture obtained at 50° to 70° C. for 24 hours.

Here, as the polyglycerol usable in the present invention, a synthesized product or a commercially available product may be used, so long as the product has desired values for the hydroxyl value and the primary hydroxyl group content ratio, or a product obtained by adjusting a hydroxyl value and/or a primary hydroxy group content ratio of the synthesized product or commercially available product in accordance with a method as mentioned above may be used.

The fatty acid which is another constituent of the polyglycerol fatty acid ester of the present invention is not particularly limited, so long as the fatty acid is a substance that contains as a functional group a carboxylic acid obtained by hydrolyzing fats and oils extracted from a natural animal or plant, and purifying the hydrolysate with or without isolation. Also, a fatty acid may be one obtained by chemical synthesis from petroleum or the like as a raw material. Alternatively, a fatty acid may be one in a reduced form by subjecting to a hydrogenation or the like, or a condensed fatty acid obtained by polycondensation of fatty acids containing a hydroxyl group, or a polymerized fatty acid obtained by heat-polymerizing a fatty acid having an unsaturated bond. The selection of these fatty acids may be appropriately determined by taking the desired effects into consideration. Specific examples include saturated or unsaturated fatty acids having 6 to 22 carbon atoms, such as caproic acid, caprylic acid, octylic acid, capric acid, lauric acid, myristic acid, palmitic acid, palmitoleic acid, stearic acid, isostearic acid, oleic acid, linoleic acid, linolenic acid, behenic acid, elaidic acid, erucic acid, ricinoleic acid having a hydroxyl group in its molecule, 12-hydroxystearic acid, and condensation products thereof, and the like. Among them, caprylic acid, capric acid, lauric acid, myristic acid, palmitic acid, stearic acid, behenic acid, and oleic acid are preferred, from the viewpoint of operability. In addition, the above fatty acid can be utilized alone or in a combination or two or more kinds, and it is preferable that the fatty acid is used as a mixed fatty acid in which the fatty acid is constituted by fatty acids shown in the following Groups (1) to (3), each of the fatty acids shown in Groups (1) to (3) is used in an amount within the range as shown below in the overall fatty acids, and the total weight of Groups (1) to (3) is 100% by weight.

Group (1): A group constituted by a saturated fatty acid having 8 to 12 atoms (amount used 45 to 70% by weight)
Group (2): A group constituted by a saturated fatty acid having 14 to 22 atoms (amount used 20 to 60% by weight)
Group (3): A group constituted by an unsaturated fatty acid having 18 to 22 atoms (amount used 0 to 20% by weight)

The esterification between the polyglycerol and the fatty acid may be carried out in accordance with a known method in the art. For example, the esterification can be carried out under a normal pressure or reduced pressure, in the presence of an alkali catalyst, an acid catalyst or in the absence of a catalyst. Specifically, an ester can be obtained by charging a polyglycerol, a fatty acid, and a catalyst, and reacting the components at a temperature of 160° to 260° C. under a nitrogen gas stream until there are no more free fatty acids.

Here, the resulting polyglycerol fatty acid ester may be further purified in accordance with the demands of the use of manufactured articles. A method of purification may be any methods, without particular limitations. For example, the purification may be carried out by subjection to an adsorption treatment with an active charcoal, an activated white clay or the like, subjection to a deodorization treatment under a reduced pressure using steam, nitrogen or the like as a carrier gas, cleaning with an acid or alkali, or subjection to molecular distillation.

The esterification percentage of the polyglycerol fatty acid ester can be adjusted by varying charging percentages of the polyglycerol and the fatty acid to be added, reaction temperature, reaction time, kinds and amount of the catalyst, and the like. The polyglycerol fatty acid ester has an esterification percentage of preferably 80% or more. When the esterification percentage is less than 80%, the solubility to the fats and oils is lowered, so that an effect of inhibiting crystallization of fats and oils is reduced in some cases.

Also, the hydroxyl value of the polyglycerol fatty acid ester can be adjusted by varying charging percentages of the polyglycerol and the fatty acid (% by weight). When the hydroxyl value is greater than 100 mg KOH/g, the polyglycerol fatty acid ester would be insoluble in fats and oils, or sufficient effects of inhibiting crystallization of fats and oils cannot be exhibited. Therefore, the polyglycerol fatty acid ester has a hydroxyl value of 100 mg KOH/g or less, preferably 80 mg KOH/g or less, more preferably 60 mg KOH/g or less, and even more preferably 30 mg KOH/g or less. In addition, the ester has a hydroxyl value of preferably 5 mg KOH/g or more, from the viewpoint of obtaining the sureness of the reaction in the esterification between the polyglycerol and the fatty acid.

The polyglycerol fatty acid ester has an HLB value of preferably from 1 to 7, and more preferably from 1 to 6, from the viewpoint of solubility in fats and oils, and an effect of inhibiting crystal growth of fats and oils. Here, the HLB value as referred to herein is a value calculated by the following formula:

$$HLB = 20 \times (1 - S/A)$$

wherein S is a saponification value of the ester, and A is an acid value of the constituting fatty acid.

The polyglycerol fatty acid ester in the present invention is thus obtained. The inhibitor for crystal growth of fats and oils of the present invention contains the polyglycerol fatty acid ester mentioned above as a substantial active ingredient, and other additives known in the field may be contained within the range so as not to impair the effects of the present invention. The polyglycerol fatty acid ester is contained in an amount of preferably 80% by weight or more, more preferably 90% by weight or more, and even more preferably substantially 100% by weight, of the inhibitor for crystal growth of fats and oils.

The present invention also provides a composition of fats and oils containing fats and oils and the inhibitor for crystal growth of fats and oils.

The fats and oils, in other words, fats and oils of which crystal growth is inhibited by the polyglycerol fatty acid ester is not particularly limited, so long as the fats and oils are edible fats and oils, such as palm oil, palm olein, soybean oil, rapeseed oil, canola oil, rice oil, maize oil, cottonseed oil, olive oil, safflower oil, sesame oil, sunflower oil, or cacao butter, a blend oil thereof, or the like, edible fats and oils produced by transesterification or fractional crystallization, or the like of an animal or plant oil.

The polyglycerol fatty acid ester is contained in the composition in an amount of preferably from 0.005 to 5% by weight, and more preferably from 0.010 to 3% by weight, from the viewpoint of an effect of inhibiting crystal growth of fats and oils. When the polyglycerol fatty acid ester is contained in an amount of 0.005% by weight or more, a sufficient effect of inhibiting crystallization of fats and oils is obtained, and when the polyglycerol fatty acid ester is contained in an amount of 5% by weight or less, the crystallization of the fats and oils would not be accelerated, so that the fats and oils to which the ester is applicable are not limited. Here, as the polyglycerol fatty acid ester of the present invention, two or more kinds of the polyglycerol fatty acid esters having a hydroxyl value of 100 mg KOH/g or less may be used in combination. A total content in that case is preferably within the range mentioned above.

In addition, the composition of fats and oils of the present invention can contain an additive known in the field, so long as the composition of fats and oils contains the fats and oils and the polyglycerol fatty acid ester mentioned above.

EXAMPLES

The present invention will be specifically described hereinbelow by Examples and Comparative Examples, without intending to limit the scope of the present invention to these Examples and the like.

[Measurement of Primary Hydroxyl Group Content Ratio]

The percentages of primary hydroxyl groups and secondary hydroxyl groups in the polyglycerol are determined by spectroscopy in a nuclear magnetic resonance spectrometer (13C-NMR).

Five-hundred milligrams of a polyglycerol was dissolved in 2.8 mL of deuterated water, and after filtrating the solution, 13C-NMR (125 MHz) spectra is obtained by gated decoupling. In the gated decoupling measurement method, the peak intensity is proportional to the number of carbon atoms. 13C chemical shifts showing the presence of the primary hydroxyl groups and the secondary hydroxyl groups are near 63 ppm for methylene carbon ($CH_2OH$), and near 71 ppm for methyne carbon (CHOH), respectively, and the existence ratio of the primary hydroxyl groups to the secondary hydroxyl groups is calculated by analyzing signal intensity of each of two kinds. However, the methyne carbon (CHOH) showing a secondary hydroxyl group overlaps with a methylene carbon peak also adjacent to the methyne carbon bonding to methylene carbon showing a primary hydroxyl group, and an integral of itself cannot be obtained. Therefore, the integral is calculated from the signal intensity near 74 ppm of methylene carbon ($CH_2$) adjacent to the methyne carbon (CHOH).

Example 1

Synthesis Example 1

To a three-necked flask equipped with a thermometer, a Dimroth, and a stirrer were added 200 g of a polyglycerol (GREAT OIL KT-1) manufactured by Taiyo Kagaku Co., Ltd. and 600 mL of pyridine Thereto was added 370 g of chlorotriphenylmethyl (manufactured by Wako Pure Chemical Industries, Ltd.), a reagent selectively reactive with a primary hydroxyl group, and the mixture was stirred at 100° C. for 1 hour, cooled to room temperature (25° C.), and stirred for additional 24 hours. Thereafter, the reaction mixture was distilled under a reduced pressure to remove a major part of the pyridine. To the reaction mixture obtained was added 800 mL of water, and the mixture obtained was transferred to a separatory funnel, and extracted with 400 mL of ethyl acetate (number of extractions: 3 times). The ethyl acetate layers were combined and concentrated, and 156 g of the residue obtained and 300 g of acetic acid were added to a three-necked flask equipped with a thermometer, a Dimroth, and a stirrer, and the mixture was refluxed while heating at 120° C. for 8 hours to remove a triphenylmethyl group, and thereafter the product was purified to obtain a polyglycerol A. The resulting polyglycerol A had a hydroxyl value of 840 mg KOH/g, a primary hydroxyl group content ratio of 52.5%, and a secondary hydroxyl group content ratio of 47.5%.

A 300 mL four-necked flask was charged with 60 g of the polyglycerol A obtained above, 180 g of a mixture of fatty acids listed in Table 1 (hereinafter referred to as a mixed fatty acid), and 0.1 g of sodium hydroxide as a catalyst, and the components were reacted at 250° C. while removing water generated under a nitrogen gas stream, to obtain a polyglycerol fatty acid ester A having a hydroxyl value of 25 mg KOH/g. Here, in the mixed fatty acid, as the fatty acid of the group (1), a saturated fatty acid having 8 to 12 carbon atoms, in other words, a fatty acid containing one or more members selected from the group consisting of caprylic acid and lauric acid (manufactured by Taiyo Kagaku Co., Ltd.) was used; as the fatty acid of the group (2), a saturated fatty acid having 14 to 22 carbon atoms, in other words, a fatty acid containing one or more members selected from the group consisting of myristic acid, palmitic acid, and stearic acid (manufactured by Taiyo Kagaku Co., Ltd.) was used; and as the fatty acid of the group (3), an unsaturated fatty acid having 18 to 22 carbon atoms, in other words, oleic acid (manufactured by Taiyo Kagaku Co., Ltd.) was used.

Example 2

Synthesis Example 2

The same procedures as in Synthesis Example 1 were carried out except that a polyglycerol (GREAT OIL KT-2) manufactured by Taiyo Kagaku Co., Ltd. was used in place of the polyglycerol (GREAT OIL KT-1), to obtain a purified polyglycerol B having a hydroxyl value of 803 mg KOH/g, a primary hydroxyl group content ratio of 62.1%, a secondary hydroxyl group content ratio of 37.9%. Thereafter, a 300 mL four-necked flask was charged with 60 g of the polyglycerol B obtained, 180 g of a mixed fatty acid listed in Table 1, and 0.1 g of sodium hydroxide, and the components were reacted at 250° C. under a nitrogen gas stream, while removing water generated, to obtain a polyglycerol fatty acid ester B having a hydroxyl value of 18 mg KOH/g.

Example 3

Synthesis Example 3

The same procedures as in Synthesis Example 1 were carried out except that a polyglycerol (GREAT OIL KT-3) manufactured by Taiyo Kagaku Co., Ltd. was used in place of the polyglycerol (GREAT OIL KT-1), to obtain a purified polyglycerol C having a hydroxyl value of 790 mg KOH/g, a primary hydroxyl group content of 63.0%, a secondary hydroxyl group content ratio of 37.0%. Thereafter, a 300 mL, four-necked flask was charged with 64.8 g of the polyglycerol C obtained, 175.2 g of a mixed fatty acid listed in Table 1, and 0.1 g of sodium hydroxide, and the components were reacted at 250° C. under a nitrogen gas stream, while removing water generated, to obtain a polyglycerol fatty acid ester C having a hydroxyl value of 35 mg KOH/g.

Example 4

Synthesis Example 4

The same procedures as in Synthesis Example 3 were carried out to obtain a polyglycerol C. Thereafter, a 300 mL, four-necked flask was charged with 63.6 g of the polyglycerol C obtained, 176.4 g of a mixed fatty acid listed in Table 1, and 0.1 g of sodium hydroxide, and the components were reacted at 250° C. under a nitrogen gas stream, while removing water generated, to obtain a polyglycerol fatty acid ester D having a hydroxyl value of 15 mg KOH/g.

Example 5

Synthesis Example 5

The same procedures as in Synthesis Example 3 were carried out to obtain a polyglycerol C. Thereafter, a 300 mL four-necked flask was charged with 67.2 g of the polyglycerol C obtained, 172.8 g of a mixed fatty acid listed in Table 1, and 0.1 g of sodium hydroxide, and the components were reacted at 250° C. under a nitrogen gas stream, while removing water generated, to obtain a polyglycerol fatty acid ester E having a hydroxyl value of 24 mg KOH/g.

Example 6

Synthesis Example 6

The same procedures as in Synthesis Example 1 were carried out except that a polyglycerol (GREAT OIL KT-X) manufactured by Taiyo Kagaku Co., Ltd. was used in place of the polyglycerol (GREAT OIL KT-1), to obtain a purified polyglycerol D having a hydroxyl value of 766 mg KOH/g, a primary hydroxyl group content ratio of 71.9%, a secondary hydroxyl group content ratio of 28.1%. Thereafter, a 300 mL, four-necked flask was charged with 64.8 g of the polyglycerol D obtained, 175.2 g of a mixed fatty acid listed in Table 1, and 0.1 g of sodium hydroxide, and the components were reacted at 250° C. under a nitrogen gas stream, while removing water generated, to obtain a polyglycerol fatty acid ester F having a hydroxyl value of 13 mg KOH/g.

Comparative Example 1

Synthesis Example 7

The same procedures as in Synthesis Example 1 were carried out except that a polyglycerol (GREAT OIL KT-4) manufactured by Taiyo Kagaku Co., Ltd. was used in place of the polyglycerol (GREAT OIL KT-1), to obtain a purified polyglycerol E having a hydroxyl value of 1077 mg KOH/g, a primary hydroxyl group content ratio of 45.8%, a secondary hydroxyl group content ratio of 54.2%. Thereafter, a 300 mL four-necked flask was charged with 42 g of the polyglycerol E obtained, 198 g of a mixed fatty acid listed in Table 1, and 0.1 g of sodium hydroxide, and the components were reacted at 250° C. under a nitrogen gas stream, while removing water generated, to obtain a polyglycerol fatty acid ester G having a hydroxyl value of 22 mg KOH/g.

Comparative Example 2

Synthesis Example 8

The same procedures as in Synthesis Example 1 were carried out except that a polyglycerol (GREAT OIL KT-5) manufactured by Taiyo Kagaku Co., Ltd. was used in place of the polyglycerol (GREAT OIL KT-1), to obtain a purified polyglycerol F having a hydroxyl value of 988 mg KOH/g, a primary hydroxyl group content ratio of 46.3%, a secondary hydroxyl group content ratio of 53.7%. Thereafter, a 300 mL four-necked flask was charged with 46.8 g of the polyglycerol F obtained, 193.2 g of a mixed fatty acid listed in Table 1, and 0.1 g of sodium hydroxide, and the components were reacted at 250° C. under a nitrogen gas stream, while removing water generated, to obtain a polyglycerol fatty acid ester H having a hydroxyl value of 23 mg KOH/g.

Comparative Example 3

Synthesis Example 9

The same procedures as in Synthesis Example 1 were carried out except that a polyglycerol (GREAT OIL DE-1) manufactured by Taiyo Kagaku Co., Ltd. was used in place of the polyglycerol (GREAT OIL KT-1), to obtain a purified polyglycerol G having a hydroxyl value of 886 mg KOH/g, a primary hydroxyl group content ratio of 61.3%, a secondary hydroxyl group content ratio of 38.7%. Thereafter, a 300 mL four-necked flask was charged with 52.8 g of the polyglycerol G obtained, 187.2 g of a mixed fatty acid listed in Table 1, and 0.1 g of sodium hydroxide, and the components were reacted at 250° C. under a nitrogen gas stream, while removing water generated, to obtain a polyglycerol fatty acid ester I having a hydroxyl value of 30 mg KOH/g.

Comparative Example 4

Synthesis Example 10

The same procedures as in Synthesis Example 9 were carried out to obtain a polyglycerol G. Thereafter, a 300 mL four-necked flask was charged with 168.0 g of the polyglycerol G obtained, 72.0 g of stearic acid, the fatty acid of the group (2), and 0.1 g of sodium hydroxide, and the components were reacted at 250° C. under a nitrogen gas stream, while removing water generated, to obtain a polyglycerol fatty acid ester J having a hydroxyl value of 571 mg KOH/g.

Comparative Example 5

Synthesis Example 11

The same procedures as in Synthesis Example 3 were carried out to obtain a polyglycerol C. Thereafter, a 300 mL four-necked flask was charged with 74.4 g of the polyglycerol C obtained, 165.6 g of a mixed fatty acid listed in Table 1, and 0.1 g of sodium hydroxide, and the components were reacted at 250° C. under a nitrogen gas stream, while removing water generated, to obtain a polyglycerol fatty acid ester K having a hydroxyl value of 110 mg KOH/g.

obtained, for example, by allowing the test tube after storage to stand, reading the scales at the top of the packed substance and the top of the precipitated crystals, and calculating the percentage of the scale height of the precipitated crystals when supposing that the scale height of the entire packed substance is 100%. In addition, as Reference Example 1, the evaluation was carried out in the same manner for a composition of fats and oils without adding a polyglycerol fatty acid ester, in other words, a blend oil alone.

[Evaluation Criteria for Effect of Inhibiting Crystal Growth]

5: Crystal precipitation is not found, and the composition is transparent;
4: Crystal precipitation is found (amount of precipitation is less than 10% of the entire amount of the system);

TABLE 1

| | | Polyglycerol | | | Mixed Fatty Acids | | | Hydroxyl Value of Polyglycerol |
|---|---|---|---|---|---|---|---|---|
| | | Hydroxyl Value (mgKOH/g) | Primary Hydroxyl Group Content Ratio (%) | Secondary Hydroxyl Group Content Ratio (%) | Group (1) | Group (2) | Group (3) | Fatty Acid Ester (mgKOH/g) |
| Ex. 1 | Polyglycerol Fatty Acid Ester A | 840 | 52.5 | 47.5 | 45 | 55 | 0 | 25 |
| Ex. 2 | Polyglycerol Fatty Acid Ester B | 803 | 62.1 | 37.9 | 45 | 55 | 0 | 18 |
| Ex. 3 | Polyglycerol Fatty Acid Ester C | 790 | 63.0 | 37.0 | 50 | 50 | 0 | 35 |
| Ex. 4 | Polyglycerol Fatty Acid Ester D | 790 | 63.0 | 37.0 | 60 | 30 | 10 | 15 |
| Ex. 5 | Polyglycerol Fatty Acid Ester E | 790 | 63.0 | 37.0 | 70 | 20 | 10 | 24 |
| Ex. 6 | Polyglycerol Fatty Acid Ester F | 766 | 71.9 | 28.1 | 70 | 30 | 0 | 13 |
| Comp. Ex. 1 | Polyglycerol Fatty Acid Ester G | 1077 | 45.8 | 54.2 | 0 | 60 | 40 | 22 |
| Comp. Ex. 2 | Polyglycerol Fatty Acid Ester H | 988 | 46.3 | 53.7 | 10 | 80 | 10 | 23 |
| Comp. Ex. 3 | Polyglycerol Fatty Acid Ester I | 886 | 61.3 | 38.7 | 20 | 30 | 50 | 30 |
| Comp. Ex. 4 | Polyglycerol Fatty Acid Ester J | 886 | 61.3 | 38.7 | 0 | 100 | 0 | 571 |
| Comp. Ex. 5 | Polyglycerol Fatty Acid Ester K | 790 | 63.0 | 37.0 | 20 | 30 | 50 | 110 |

*: The fatty acid of each of Groups is expressed by an amount used (% by wt.) supposing that a total amount of the mixed fatty acids is 100% by wt.
Group (1): Fatty acid constituted by a saturated fatty acid having 8 to 12 carbon atoms;
Group (2): Fatty acid constituted by a saturated fatty acid having 14 to 22 carbon atoms; and
Group (3): Fatty acid constituted by an unsaturated fatty acid having 18 to 22 carbon atoms;

Test Example 1

Effect of Inhibiting Crystal Growth

A blend oil was prepared by mixing and combining 30% by weight of palm-olein and 70% by weight of soybean oil, and to this blend oil was added the polyglycerol fatty acid ester (inhibitor for crystal growth of fats and oils) obtained so as to contained in an amount of 0.3% by weight. The components were dissolved while stirring to prepare a composition of fats and oils (Examples 7 to 12 and Comparative Examples 6 to 10). The composition of fats and oils obtained was packed in a graduated test tube, and the test tube was tightly sealed. Thereafter, the composition of fats and oils was stored in a thermostat held at 5° C., and the crystal precipitation state after one week, two weeks, one month, two months, and three months was visually observed, and an effect of inhibiting crystal growth was evaluated in accordance with the following evaluation criteria. The results are shown in Table 2. Here, the precipitated crystals are sedimented at the bottom of the test tube; therefore, the amount of crystals precipitated can be 3: Crystal precipitation is found (amount of precipitation is 10% or more and less than 30% of the entire amount of the system);
2: Crystal precipitation is found (amount of precipitation is 30% or more and less than 50% of the entire amount of the system); and
1: Crystal precipitation is found (amount of precipitation is 50% or more of the entire amount of the system).

TABLE 2

| | | Crystal Precipitation State | | | | |
|---|---|---|---|---|---|---|
| | Polyglycerol Fatty Acid Ester | After 1 week | After 2 weeks | After 1 mon. | After 2 mon. | After 3 mon. |
| Ex. 7 | Polyglycerol Fatty Acid Ester A | 5 | 5 | 4 | 4 | 3 |
| Ex. 8 | Polyglycerol Fatty Acid Ester B | 5 | 5 | 5 | 4 | 4 |
| Ex. 9 | Polyglycerol Fatty Acid Ester C | 5 | 5 | 5 | 5 | 4 |

TABLE 2-continued

| | Polyglycerol Fatty Acid Ester | Crystal Precipitation State | | | | |
|---|---|---|---|---|---|---|
| | | After 1 week | After 2 weeks | After 1 mon. | After 2 mon. | After 3 mon. |
| Ex. 10 | Polyglycerol Fatty Acid Ester D | 5 | 5 | 5 | 5 | 4 |
| Ex. 11 | Polyglycerol Fatty Acid Ester E | 5 | 5 | 5 | 5 | 4 |
| Ex. 12 | Polyglycerol Fatty Acid Ester F | 5 | 5 | 5 | 5 | 5 |
| Comp. Ex. 6 | Polyglycerol Fatty Acid Ester G | 2 | 2 | 1 | 1 | 1 |
| Comp. Ex. 7 | Polyglycerol Fatty Acid Ester H | 2 | 2 | 1 | 1 | 1 |
| Comp. Ex. 8 | Polyglycerol Fatty Acid Ester I | 2 | 2 | 1 | 1 | 1 |
| Comp. Ex. 9 | Polyglycerol Fatty Acid Ester J | 1 | 1 | 1 | 1 | 1 |
| Comp. Ex. 10 | Polyglycerol Fatty Acid Ester K | 3 | 3 | 2 | 1 | 1 |
| Ref. Ex. 1 | No Polyglycerol Fatty Acid Ester Being Added | 2 | 1 | 1 | 1 | 1 |

It can be seen from Table 2 that the crystal growth of fats and oil is inhibited by adding to edible fats and oils a polyglycerol fatty acid ester obtained using a specified polyglycerol, and that the effect is sustained. Also, it was found from the results of Examples 7 to 12 that an effect of inhibiting crystal growth of fats and oils is exhibited even with the polyglycerol fatty acid ester of which constituting fatty acids are different, so long as hydroxyl value and primary hydroxyl group content ratio of the polyglycerol, and hydroxyl value of the polyglycerol fatty acid ester are within the ranges mentioned above.

INDUSTRIAL APPLICABILITY

Since the inhibitor for crystal growth of fats and oils of the present invention can inhibit crystal growth of fats and oils by adding the inhibitor to fats and oils, storage property of the fats and oils in a refrigerator, cold climates, or the like, so that the inhibitor can be suitably used in liquid fats and oils such as salad oil for which transparency is important.

The invention claimed is:
1. A composition of fats and oils consisting essentially of fats and oils, and
a polyglycerol fatty acid ester, which is an esterified product formed between a polyglycerol and a fatty acid, the polyglycerol having a hydroxyl value of 850 mg KOH/g or less and a ratio of primary hydroxyl groups to all the hydroxyl groups of the polyglycerol of 50% or more,
wherein the polyglycerol fatty acid ester has a hydroxyl value of 100 mg KOH/g or less and a Hydrophilic-Lipophilic Balance of 1 to 6,
wherein the total content of one or more unsaturated fatty acids having 18 to 22 carbon atoms is 0 to 20% by weight of the fatty acid, wherein the content of one or more saturated fatty acids having 8 to 12 carbon atoms is from 60 to 70% by weight of the fatty acid, and
wherein the composition contains the polyglycerol fatty acid ester in an amount of from 0.005 to 5% by weight.
2. A method for inhibiting crystal growth of fats and oils, comprising adding a polyglycerol fatty acid ester to the fats and oils,
wherein said polyglycerol fatty acid ester is an esterified product formed between a polyglycerol and a fatty acid, the polyglycerol having a hydroxyl value of 850 mg KOH/g or less and a ratio of primary hydroxyl groups to all the hydroxyl groups of the polyglycerol of 50% or more,
wherein the total content of one or more unsaturated fatty acids having 18 to 22 carbon atoms is 0 to 20% by weight of the fatty acid, wherein the content of one or more saturated fatty acids having 8 to 12 carbon atoms is from 60 to 70% by weight of the fatty acid, and
wherein the polyglycerol fatty acid ester has a hydroxyl value of 100 mg KOH/g or less and a Hydrophilic-Lipophilic Balance of 1 to 6.
3. The method according to claim 2,
wherein the polyglycerol fatty acid ester is added in an amount of from 0.005 to 5% by weight of an obtained composition.
4. The method according to claim 2,
wherein the fats and oils comprise one or more members selected from the group consisting of palm oil, palm olein, soybean oil, rapeseed oil, canola oil, rice oil, maize oil, cottonseed oil, olive oil, safflower oil, sesame oil, sunflower oil, cacao butter and a blend of oils thereof.

* * * * *